United States Patent [19]

Flinchbaugh

[11] Patent Number: 4,633,402
[45] Date of Patent: Dec. 30, 1986

[54] METHOD AND APPARATUS FOR AUTOMATICALLY PRODUCING REPRESENTATIONS OF THREE-DIMENSIONAL HORIZONS FROM PROCESSED SEISMIC DATA

[75] Inventor: Bruce E. Flinchbaugh, Dallas, Tex.

[73] Assignee: Texas Instruments Incorporated, Dallas, Tex.

[21] Appl. No.: 669,502

[22] Filed: Nov. 8, 1984

[51] Int. Cl.⁴ .............................................. G01V 1/30
[52] U.S. Cl. ..................... 364/421; 367/38; 367/72
[58] Field of Search ...................... 364/421; 367/38, 72

[56] References Cited

U.S. PATENT DOCUMENTS 4,499,598 2/1985 Chittineni ............................. 382/54

OTHER PUBLICATIONS

"3-D Seismic Interpretation" product brochure, Western Geophysical, publication No. 85-064, 1985.
Blake, B. A. "3D Seismic Data Reveals the Finer Structural Details of a Piercement Salt Dome", Geophysical Service, Inc. publication No. 4M/782, (8209P), 1982.

Primary Examiner—Jerry Smith
Assistant Examiner—Clark A. Jablon
Attorney, Agent, or Firm—Thomas G. Devine; Leo N. Heiting; Melvin Sharp

[57] ABSTRACT

An electronic system automatically produces representations of three-dimensional recommended horizons from processed seismic data. Significant events, in the form of turnings, are identified in all of the digitized traces that make up the processed seismic data. Pairs of significant events in adjacent traces are determined. The system determines these pairs through a mutual nearest neighbor technique, together with a technique for detecting similar signs. The system measures the curvature of the path formed by the paired turnings in successive digital traces and terminates the path at any point where the curvature exceeds a predetermined limit. The system then looks for three-dimensional continuity by looking for a closed loop of at least four turnings making up four pairs of turnings. These techniques yield at least one horizon represented in a first format. The recommended horizon, represented in a second format, is essentially extracted by the system through a recursive "walking" procedure for identifying all of the turnings in the recommended horizon and designating those turnings in the second format. At the same time, vertical uniqueness of each of the turnings in the recommended horizon is examined and if a subsequent turning is found to be on the same digital trace as a prior detected turning, the subsequent turning is not permitted. The second format is used for storage of the horizon and subsequent display.

23 Claims, 19 Drawing Figures

METHOD AND APPARATUS FOR AUTOMATICALLY PRODUCING REPRESENTATIONS OF THREE-DIMENSIONAL HORIZONS FROM PROCESSED SEISMIC DATA

BACKGROUND OF THE INVENTION

1. Field of the Invention

This invention relates to the analysis of seismic data and specifically to an electronic system for automatically producing horizons from processed seismic data.

2. Description of the Prior Art

In the past, human interpreters solved the problem of producing horizons of three-dimensional seismic events mentally, using paper and colored pencils, or computer graphics, to draw a seismic event as it intersects successive two-dimensional seismic sections of a data volume. Once two-dimensional events along the three-dimensional surface have been picked, the two-way times to each of the 2-D events are determined and a variety of different types of maps are drawn to illustrate information about the event surface. The primary disadvantage of this approach is that it is very time-consuming and tedious for the human interpreters. The task of drawing maps or horizons of event surfaces is easily automated once the events are picked, but the picking is very time-consuming. A prior art method for picking and mapping events in 2-D seismic sections has been achieved. This previous approach to determining significant changes by amplitude zero-crossings in seismic traces essentially amounts to an assertion that the significant changes of interest are primarily determined by points where the trace changes sign. This technique is not well-suited to mapping seismic events whose amplitudes change signs.

BRIEF SUMMARY OF THE INVENTION

A digital computer system automatically produces representations of three-dimensional recommended horizons from processed seismic data. The seismic data is in the form of a 3-D volume of individual seismic traces in a digital format.

Significant seismic events, in the form of turnings, are identified in all of the digitized traces that make up the processed seismic data. These turnings are defined as zero-crossings in the Nth derivative of a seismic trace. The digitized seismic traces of this invention are represented by a series of points. An approximation of the Nth derivative at each point is made. A zero-crossing in the Nth derivative determines a turning point. A turning occurs at the location of each such zero-crossing and the sign of the turning is the sign of the (N+1)th derivative at that point. This technique is described and claimed in copending U.S. patent application, Ser. No. 669,504.

Next, in the X and Y directions, through the 3-D data volume, pairs of turnings are determined. In this preferred embodiment, pairs of turnings are determined through the use of the mutual nearest neighbor technique. In this technique, a pair occurs wherever two turnings, taking one each from adjacent traces, are mutual nearest neighbors. That is, point A is the nearest neighbor of point B, and point B is the nearest neighbor of point A. This mutuality presumes that the two turnings occurred on the same three-dimensional seismic surface (horizon).

The signs of the turnings are then determined, and if alike, further assure that points A and B are in the same horizon. The sign of each turning is the sign of the (N+1)th derivative at each zero-crossing. The determination of pairs of turnings is described and claimed in copending U.S. patent application, Ser. No. 669,505.

The curvature of the path formed by the paired turnings in successive digital traces, in both the X and Y direction, is examined. If the curvature is too extreme, the path is terminated. Restricting pairs of turnings in this manner eliminates some implausible 3-D seismic events.

Three-dimensional continuity is then tested. This is done by looking for closed loops containing four turnings formed by four pairs of turnings. The existence of such a closed loop helps to assure that the seismic event has three-dimensional extent as a surface, and not just as a curve. When a pair is not a part of such a closed loop, the pair is eliminated. This examination and modification of tentative horizons is described and claimed in copending U.S. patent application Ser. No. 669,503.

By reason of the system performing the above steps, one or more horizons have been defined within the three-dimensional block of data.

The defined horizons may now be, in essence, extracted from the 3D data volume for ease of display and handling in general. This is done by the system through reformatting from the network format, resulting from the above treatment, to an array format.

At the same time, another analysis is performed to determine that defined horizons are not interconnected. A test for vertical uniqueness is performed by excluding any subsequent turning on the same digital trace as a prior detected turning. This vertical uniqueness assures that a horizon cannot spiral. An array format provides a more convenient representation of each horizon. The arrays are better suited for storage and display than the networks. This extraction of horizons is described and claimed in copending U.S. patent application Ser. No. 669,501.

The object of this invention is to provide a system that automatically defines three-dimensional horizons from a three-dimensional volume of processed seismic data. This and other objects will be made evident in the detailed description that follows.

DETAILED DESCRIPTION OF THE INVENTION

Three dimensional seismic data is collected typically through the use of vibrators for land data collection and air guns for sea data collection. In either event, the data is collected, processed, and presented as a three-dimensional volume formed of digitized traces. The traces are represented as a series of points, each point being described digitally. By examining the series of points for significant seismic events and by interrelating significant events between traces, three dimensional horizons may be developed.

The processed three-dimensional seismic data sections traditionally have been interpreted by human experts. A tedious and time-consuming task that the interpreter must perform is to pick seismic events through the volume and to map the time and amplitude structure of the events. This invention addresses the problems of automatically picking and mapping three-dimensional seismic event horizons.

Figure 1A:
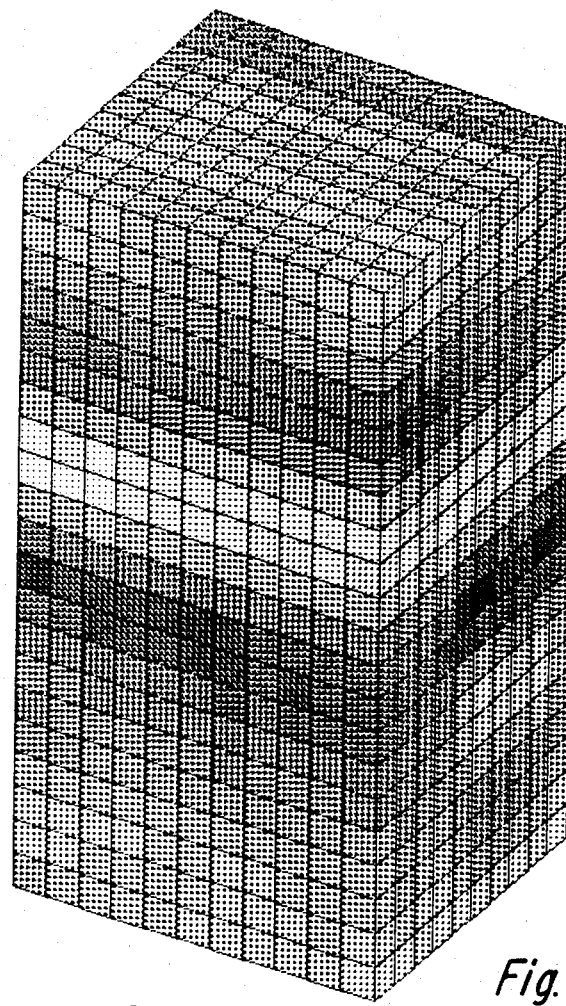
FIG. 1A illustrates a three-dimensional volume of seismic data.

FIG. 1A illustrates a typical processed three-dimensional seismic data volume 40. The gradations in shade are generally proportional to changes in amplitude of the seismic signal returned as a result of a seismic source such as a vibrator or air gun having been activated.

Figure 1B:
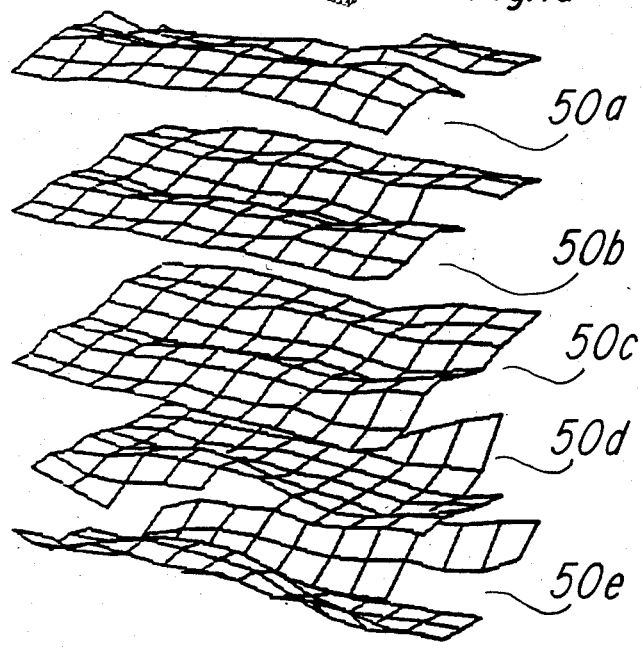
FIG. 1B illustrates three-dimensional horizons produced from the volume of FIG. 1A, using the method and apparatus of this invention.

FIG. 1B indicates typical three-dimensional horizons 50a-50e that lie within three-dimensional seismic volume 40 where time is the vertical dimension. These horizons are the end result of this invention and may be displayed as shown on paper, or may be displayed in the face of a cathode ray tube, or any other display apparatus. The horizons may be viewed from any direction, of course, and other information about the horizon, such as the seismic amplitudes on the surface, may also be displayed. Horizon, in the strict geophysical sense, means "geological interface". As used in this invention, horizon means "interpreter's sketch of a surface through seismic data." The wavelengths of the source typically imparted into the earth in seismic exploration are of such a magnitude as to preclude the detection of all "geological interfaces". Therefore, the horizons that are referred to in this specification are surfaces in the three-dimensional seismic volume 40 that are estimated to be everywhere locally parallel to the "geologic interfaces".

The automatic production of the horizons 50a-50e is accomplished in four steps:

Step 1: Determine and describe significant points of change along each seismic trace.

Step 2: Determine pairs of turnings such that the turnings within pairs lie on the same three-dimensional seismic event.

Step 3: Determine seismic event surfaces (horizons).

Step 4: Produce physical maps of the seismic event surfaces (horizons).

Figure 2:
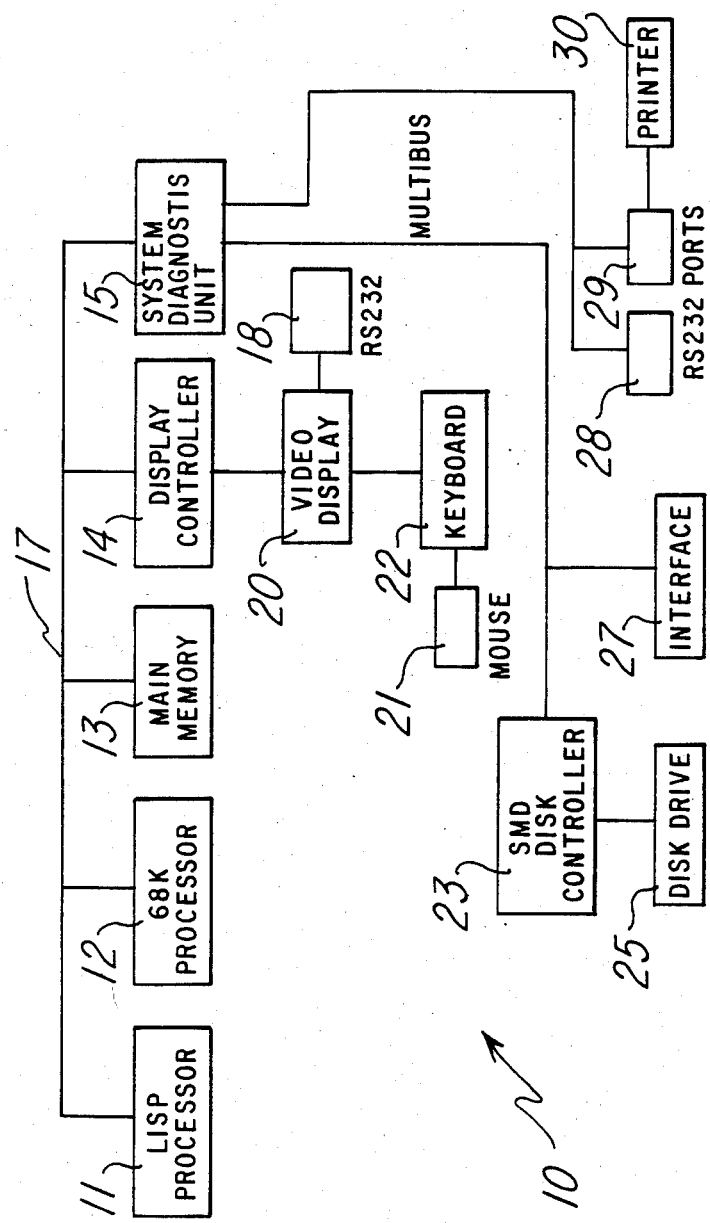
FIG. 2 is a block diagram of the computer system of this invention.

FIG. 2 illustrates the LISP machine of this invention, a LAMBDA machine made by LISP Machines, Inc. The LAMBDA system and the use of the LISP programs in the Appendix, are set out in detail in the following manuals of LISP Machine, Inc.:

"Introduction to the LISP System"—1983
"ZMACS-Introductory Manual"—1983
"ZMAIL Manual"—April 1983;
"Window System Manual"—August 1983;
"Lisp Machine Manual"—January 1983;
"System 94 Release Notes"—Undated In block form, a LISP processor 11 is connected via bus 17 (a Texas Instruments NuBus TM type bus) to a Motorola 68000 processor 12, main memory 13, display controller 14 and system diagnostic unit 15. Display controller 14 controls video display 20 which is connected to RS232 interface 18. The video display 20 may be used for displaying the representation of the three-dimensional section 40 and for the display of the horizons 50a-50e. Keyboard 22 and mouse 21 are connected to video display 20 for interaction therewith. SMD disk controller 23 controls disk drive 25 which is used for storage as is main memory 13. Printer 30 is connected to RS232 port 29 which in turn is connected through the system diagnostic unit 15 to LISP processor 11, main memory 13 and SMD disk controller 23. The printer 30 is therefore accessible to a storage unit for receiving a representation of the horizons 50a-50d for printing hard copies of the desired images.

Figure 3:
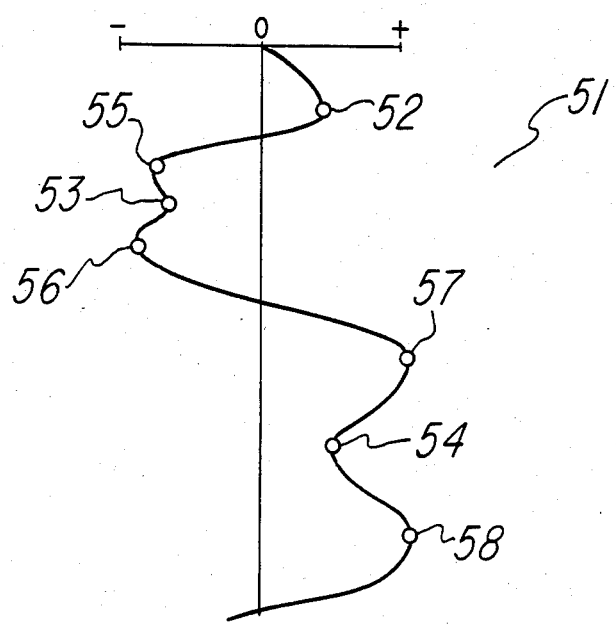
FIG. 3 illustrates a typical trace is analog form.

Turning now to FIG. 3, Step 1 as carried out by system 10 will be described. For the purpose of description, each significant point of change along a seismic trace is a turning. The description of a turning includes its position in the volume, the amplitude of the seismic trace at that position, and its sign (negative or positive). Trace 51 is represented in an analog manner. Points 52-58 represent turning points in the case where turnings are defined by zero-crossings in the first derivative. In fact, trace 51 is represented by a series of digital numbers. Each number signifies an amplitude. Turning points 52, 54, 57 and 58 have positive amplitudes and points 53, 55, and 56 have negative amplitudes. However, the signs of the turning are determined by the $(N+1)$th derivative of the trace and therefore the sign of turnings 54, 55 and 56 are positive while the sign of turning points 52, 53, 57 and 58 are negative. The turning points are determined using zero-crossings in the Nth derivative. The turnings have the advantage of distinctly marking significant changes such as local extrema, saddle points, inflections and other high-order changes. This is in contrast to prior art methods of looking at the zero crossings of the original trace as significant. Exactly which changes are marked can be controlled by varying the value of N, a parameter of step 1. The derivative at each sample point, t0, is approximated as follows:

1. Let $t-$, $t0$, and $t+$ be the times of three consecutive sample points.
2. Let $A(t)$ be the amplitude of the trace at time t.
3. Then the derivative, D, of the trace at t0 is computed by:

$$D(t0) = (A(t+) - A(t-))/2$$

This approximation for computing the derivative is derived from the parabola P, passing through $(t-, A(t-))$, $(t0, A(t0))$, and $(t+, A(t+))$. $D(t0)$ is the slope of P at t0. The solution is simple because the sample points are regularly spaced at unit intervals, allowing the following property of parabolas to be exploited:

Theorem: Let $P(x) = AX^2 + BX + C$. Then the derivative of P at a value half way between two values, v and w, is the slope of the line through $(v, P(v))$ and $(w, P(w))$. That is:

$$P'((v+w)/2) = (P(w) - P(v))/(w-v).$$

Higher order-derivatives are computed by iterative applications of the scheme for calculating the derivative as shown above.

Figure 6A:
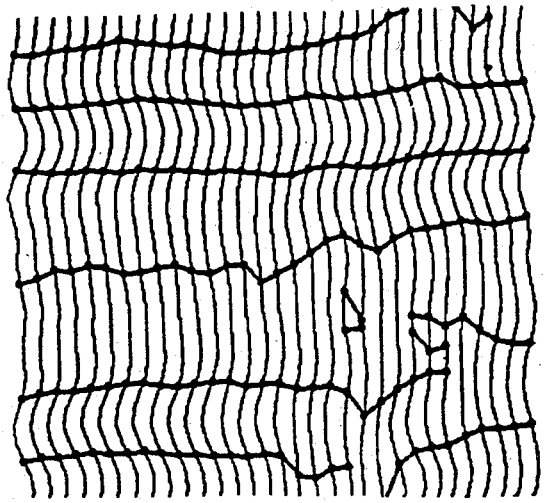
FIGS. 6A–6H illustrate traces and indicate horizons determined from zeros of successive derivatives taken with N=0 at FIG. 6A and N=7 at FIG. 6H.
Figure 6B:
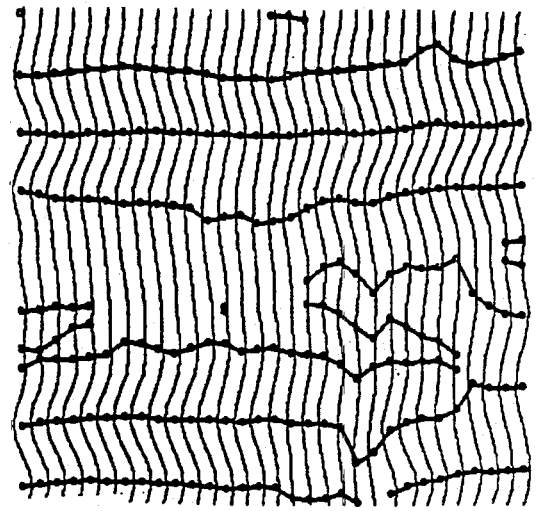
Figure 6C:
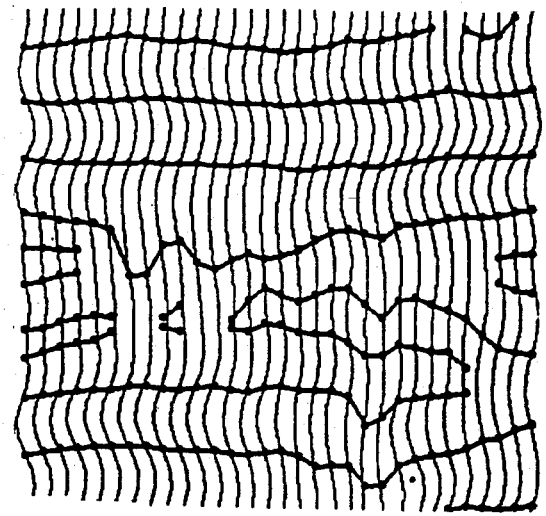
Figure 6D:
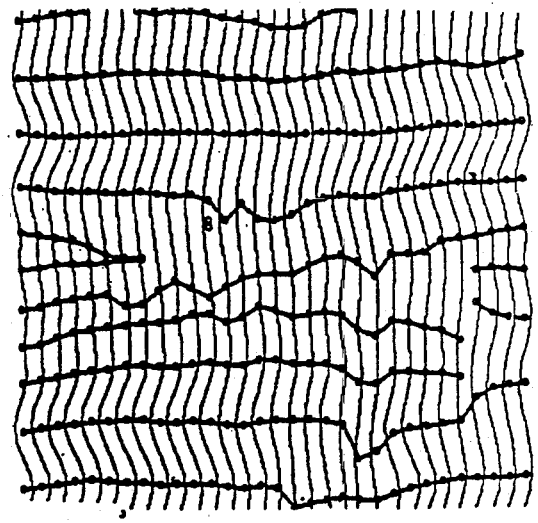
Figure 6E:
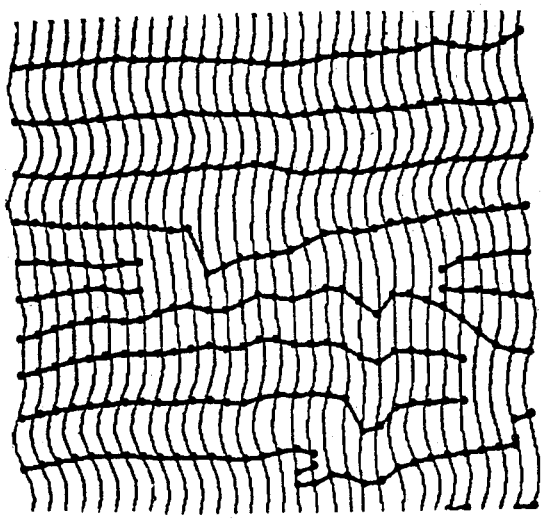
Figure 6F:
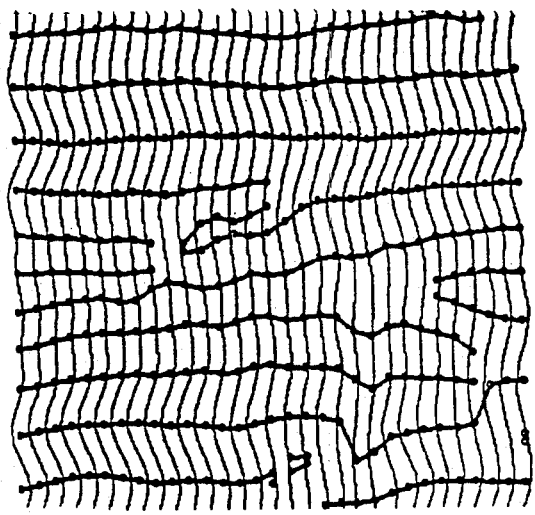
Figure 6G:
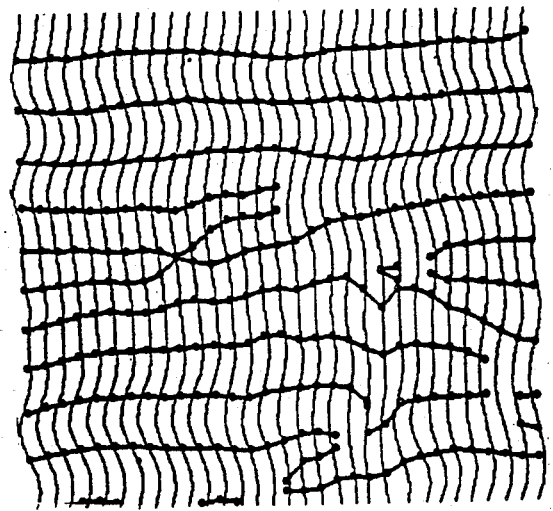
Figure 6H:
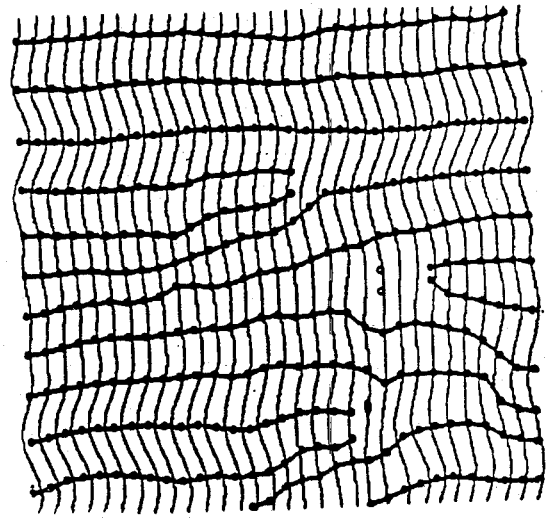

In principle, the first derivative defines turnings at local extrema and saddles of the seismic trace. The first derivative therefore captures attributes of an important turning point quite well. The second derivative defines turnings at inflections and straight segments of the trace. In that case, the term "turning" is somewhat of a misnomer, but the inflections may serve just as well or better than the local extrema and saddles for a given trace. As N becomes larger, smoother and more complete three-dimensional horizons are produced. In practice, $N=7$ has the advantage of marking changes or mapping that are ordinarily not noticed by human inspection. This may be seen by an inspection of FIGS. 6A-6H where FIG. 6A illustrates traces with $N=0$. FIG. 6B illustrates $N=1$, FIG. 6C illustrates $N=2$, and so on with FIG. 6H illustrating $N=7$. The implementation of this step 1 may be seen in the appendix under the title "STEP 1: DETERMINE TURNING POINTS".

By specifying only those points that are turning points in the Nth derivative, data compaction is accomplished. Of course, a variety of other techniques, including frequency domain filters, may be employed to approximate the derivatives.

Figure 4:
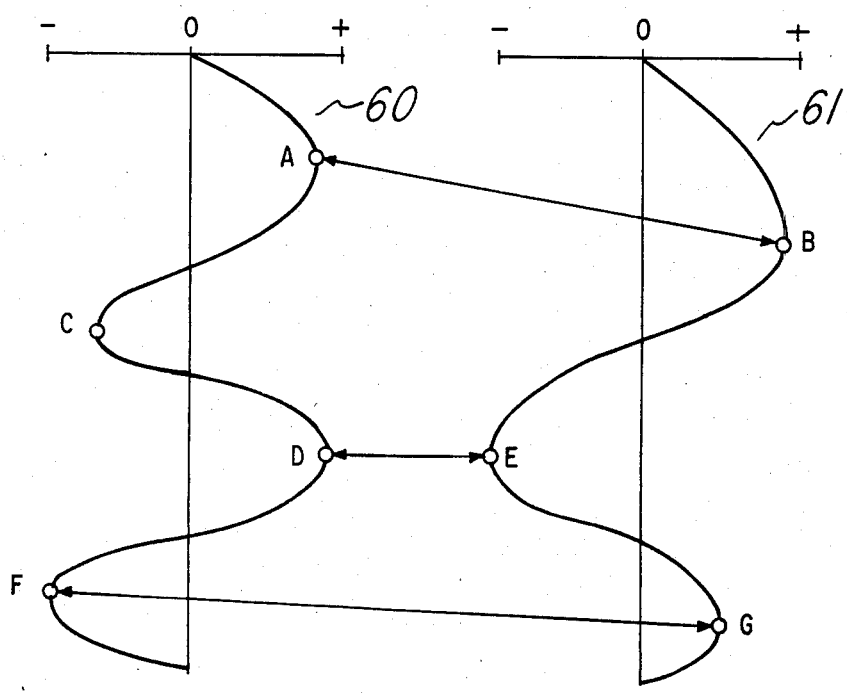
FIG. 4 illustrates two analog traces in the application of the mutual nearest neighbor criterion.

FIG. 4 illustrates traces 60 and 61 having the mutual nearest neighbor criterion applied. The mutual nearest neighbor criterion was originally devised and used for solving problems in computer vision as set out in the Ph.D dissertation "A Computational Theory of Spatio-Temporal Aggregation for Visual Analysis of Objects in Dynamic Environments" by Bruce E. Flinchbaugh, The Ohio State University, June 1980.

This mutual nearest neighbor criterion has been applied in the past to seismic interpretation relating to two dimensional seismic sections. This prior art technique involved the two-dimensional lineation of wavelets. Wavelets are defined as that portion of a wiggle trace between amplitude zero-crossings when $N=0$. A lineation refers to a two-dimensional horizon in a 2-D seismic section. However, a technique is applied herein for the first time to a three-dimensional volume 40. That is, the mutual nearest neighbor criterion is applied in the X direction and in the Y direction to each and every turning using Nth derivative of every trace making up the three-dimensional volume 40.

In FIG. 4, turning point A is shown connecting to turning point B. That is, the nearest neighbor to point A of trace 60 in trace 61 is point B. Likewise, the nearest neighbor to point D of trace 60 is point E of trace 61. The nearest neighbor to point F of trace 60 is point G of trace 61. In a similar manner, the nearest neighbor to point B of trace 61 is point A of trace 60. The nearest neighbor of point E of trace 61 is point D of trace 60. The nearest neighbor to point G of trace 61 is point F of trace 60. The nearest neighbor of point C of trace 60 is point B of trace 61, but because point B's nearest neighbor is not point C, point C does not have a mutual nearest neighbor, thus point C is not paired with any turning. It should be noted that while these traces are shown in a 2-D analog representation, the mutual nearest neighbor is based only on the time dimension which is the vertical dimension as shown in FIG. 4.

Turning point D has been paired with turning point E. Turning point E has a radically different character from turning point D because its (N+1)th derivative is positive while turning point D's is negative. Likewise, turning point G's (N+1)th derivative is negative while turning point F's is positive.

Figure 5:
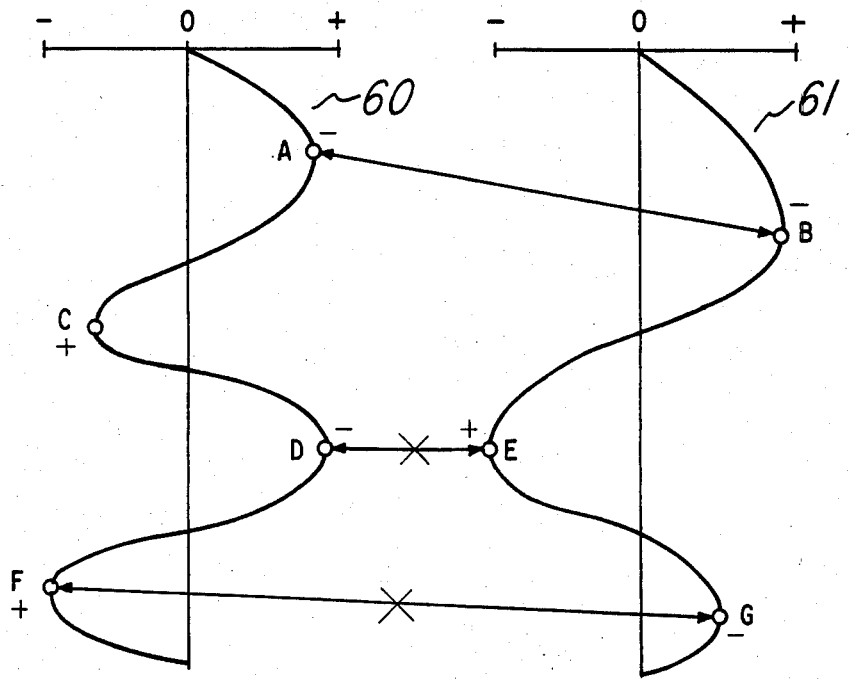
FIG. 5 is a reproduction of FIG. 4 except that the effect of also requiring like signs is illustrated.

FIG. 5 illustrates that turning points D and E may not be linked nor may turning points F and G. This prohibition against such links is made based on the assumption that the character of a three-dimensional seismic horizon, as represented by the sign of the turning cannot change radically between adjacent traces. Therefore, the criterion is that the signs must be homogeneous. The implementation of the mutual nearest neighbor and homogeneous signs criteria may be seen in the appendix under the heading "STEP 2: DETERMINE PAIRS OF TURNINGS ON THE SAME HORIZON", extending to the heading "APPLY-LOW-CURVATURE-CRITERION".

Each turning point, through this implementation, has now been identified as being paired with up to four other turnings, one in each of the four directions from the turning (the positive and negative X and Y directions).

Figure 7:
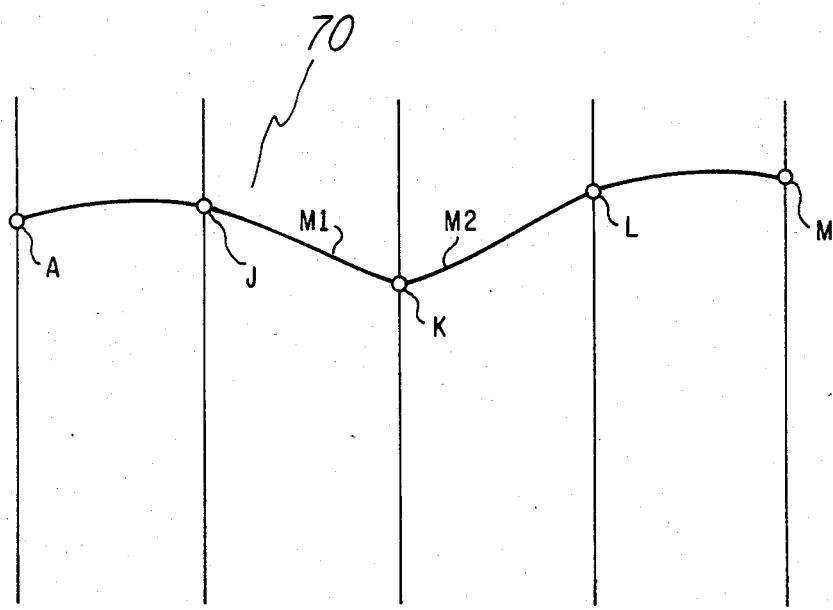
FIG. 7 illustrates the low curvature criterion.

As a part of Step 2, the curvature of the path formed by the paired turnings in successive digital traces is assessed in both the X and Y directions. In FIG. 7 line segments are drawn between paired turnings to represent path 70 through turnings H, J, K, L, and M. The curvature of the path at K is assessed by considering the slope, m1, of the segment between J and K, and the slope, m2, of the segment between K and L. If m1 and m2 differ by more than a predetermined value, the path 70 is "cut" at K by eliminating the pairs (J, K) and (K, L). The predetermined value is a parameter of the method. In other words, a pair can only occur when the curvature of the path through the turnings of the pair, together with the turnings of an incident pair in the same direction, is less than a maximum curvature. Restricting pairs of turnings in this manner helps to rule out implausible three-dimensional seismic horizons. The implementation of the low curvature criterion may be studied in the Appendix under the heading "APPLY-LOW-CURVATURE-CRITERION".

Step 2 also includes a requirement of three-dimensional continuity. This criterion requires that a pair can only occur wherever the pair is a link in a closed loop of turnings. Restricting pairs of turnings in this manner helps to assure that pairs are on seismic events that have three-dimensional extent as a horizon. This criterion is based on the assumption that if two turnings lie on a three-dimensional seismic event, then other turnings lying on the same event surface are nearby. Specifically, this criterion is described as follows:

Let T1 and T2 be sets of turnings such that T1 contains the turnings from one seismic trace and T2 contains the turnings from an adjacent trace in any direction within the seismic data section. Let a closed loop of turnings be an ordered list of at least three turnings, (t0, t1, t2, ... tn), such that the ti are distinct and the following pairs exist:

((t0, t1), (t1, t2) ... (tn−1, tn), (tn, t0)). Then t1 in T1 and t2 in T2 may only form a pair when a closed loop of turnings exists that include t1 and t2.

Figure 8A:
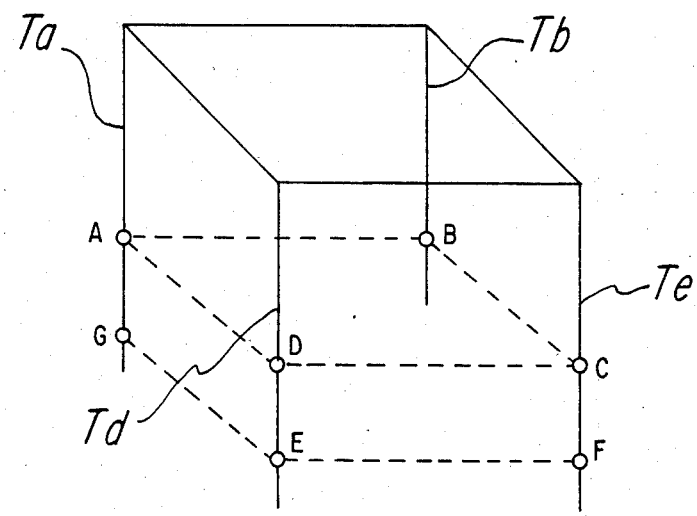
FIG. 8A illustrates 3-D continuity of four turnings forming four pairs of turnings.
Figure 8B:
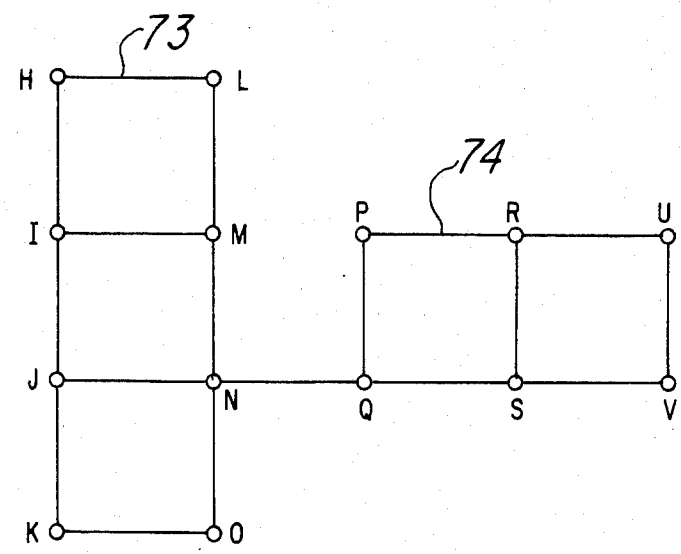
FIG. 8B, from a top view, illustrates 3-D continuity.

Closed loops spanning just a few (e.g., four) traces in closely spaced three-dimensional seismic data can be assumed to bound a region of a surface that intersects those traces. Reference to FIGS. 8A and 8B should now be made where, in FIG. 8A, four traces Ta, Tb, Tc and Td are shown. Turning point pairs (a, b) (b, c) (c, d) and (d, a) are shown forming a closed loop. The four turning points, a–d, form four pairs of turnings as indicated and also form a closed loop. On the other hand, pairs of turnings (g, e) and (e, f) do not form a closed loop and therefore do not define any surface.

A top view of a closed loop concept is shown in FIG. 8B. It can be seen that areas connected together are areas of four turnings forming four pairs of turnings in a closed loop configuration. However, the pairs of turnings (n,q) (m, n) (p, q) and (m, p) do not form a closed loop. That is, there is no pairing between turning points m and p. Therefore, the pairing (n, q) is removed and only distinct horizons 73 and 74 are determined. As may be seen in the Appendix under "APPLY-3-D-CONTINUITY-CRITERION". In that implementation, four turnings forming four pairs of turnings provide three-dimensional continuity. A pair that does not satisfy the criterion is "isolated" and rejected.

Figure 10:
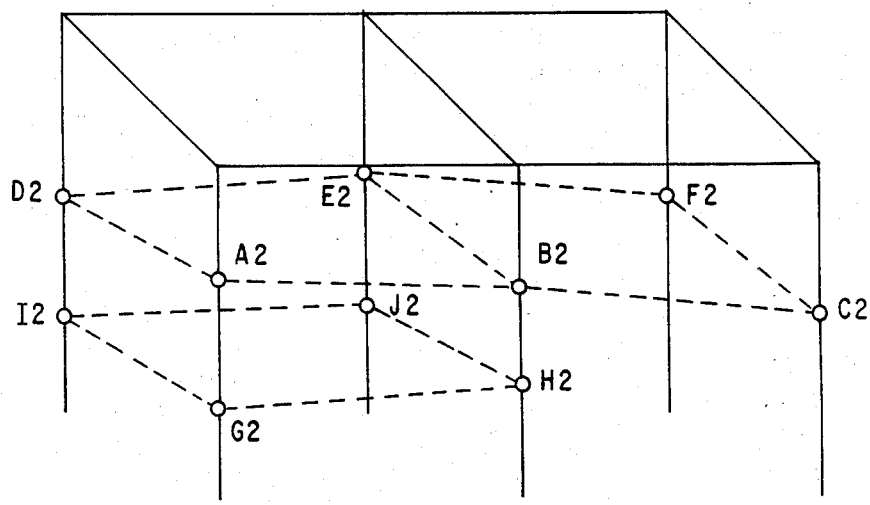
FIG. 10 illustrates transitivity of the pair relation to reformat to the array format.

After Steps 1 and 2 are completed, the horizons have been determined within the three-dimensional volume 40. To fully identify the horizon, however, entry is made at one of the turning points defining that horizon and then all of the remaining turning points that are directly or indirectly connected to the entry turning point are collected. Reference should be made to FIG. 10 to illustrate the criterion as a part of step 3. Turning point d2 is paired with turning point a2 which in turn is paired with turning point b2 which in turn is paired with turning point c2. Therefore, turning points c2 and d2 are in the same horizon. The horizon occurs therefore wherever turnings in a collection are related (directly or indirectly) by pairs. This criterion allows explicit determination of the informational content and three-dimensional extent of horizons.

This criterion is described as follows: Let the relation (pair) (ti, tj), indicate that ti and tj are turnings of the same horizon. This relation is transitive. t1 and t3 belong to the same horizon when pair (t1, t2) and pair (t2, t3) belong to the horizon, because pair (t1, t3) is implied.

The transitive property is used to complete the pair relation. The specific implementation may be studied in the Appendix under "STEP 3: EXTRACT HORIZONS". This reformatting results in an array format. The array format is appropriate for use in the printer 30 and video display 20 of FIG. 2 for displaying the recommended horizons.

Also, it may be that one horizon is connected to another horizon. Step 3 eliminates connections between horizons. A horizon can contain only turnings such that no turnings are positioned with one directly above the other. This criterion prevents spiraling horizons and assists in determining separate horizons as follows:

Let the horizontal position of a turning, ti, be (xi, yi). Then turnings t1 and t2 can only be part of the same horizon if (x1, y1) is not (x2, y2), i.e., if at most one turning of the horizon lies in any given trace in the volume 40. Thus, each turning of a horizon is guaranteed to be "vertically unique". Implementation of vertical uniqueness is shown in the Appendix, under "ADD-TURNING-TO-HORIZON".

Figure 9:
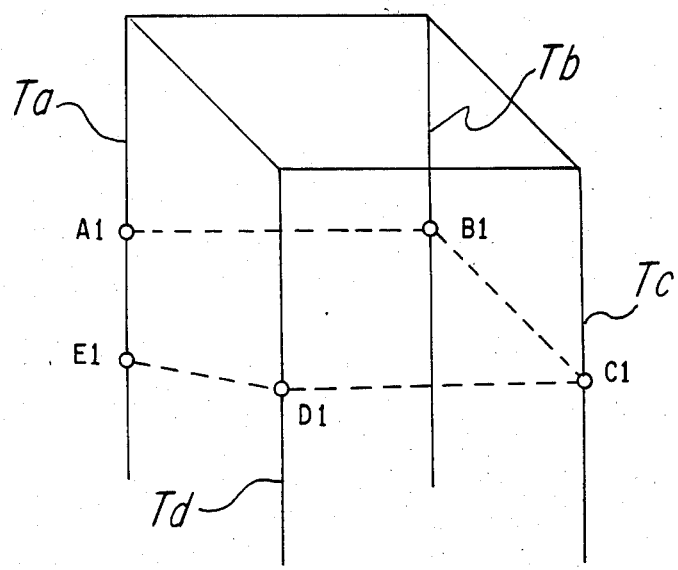
FIG. 9 illustrates vertical uniqueness.

FIG. 9 illustrates the application of this criterion. That is, a complete loop is not achieved because points a1 and e1 appear on the same trace Ta. A collection of turnings of a horizon may include a1 and d1, but turning e1 may not be included in a horizon that includes turning points a1, b1, c1 and d1.

The apparatus for both printing and CRT display are well known, as are the manner in which that apparatus operates. For a specific implementation, please refer to the Appendix under "STEP 4; DISPLAY HORIZONS".

While this invention has been described in specific steps and in specific hardware, it is contemplated that those skilled in the art may readily substitute hardware and method steps without departing from the scope of this invention which is limited only by the appended claims.

Appendix

```
; -*- Mode:Lisp; Package:Amos; Base:10. -*-

;AMOS                                          Bruce Flinchbaugh

#|============================================================
            AMOS:  Automatic Mapping of Seismic Events Terminology The term, Horizon, as used in this program, refers to a surface
computed by the Amos method.  In other documents and implementations
the surfaces are called, variously, Reflector Parallels, Seismic Event
Surfaces, and Seismic Events.  Horizon is used here for simplicity;
the surfaces do not necessarily correspond to actual horizons
(geologic interfaces).
==============================================================|#

(defflavor AMOS
  (
   (Data       nil)    ;3D array of seismic amplitudes, indices:  Time, X, and Y.
   (Dn-Data    nil)    ;3D array, the Nth partial derivative of Data w.r.t. Time.
   (N          1)      ;Integer, the order of the partial derivative in Dn-Data.
   (D          0.5)    ;Number, the maximum allowed local change in horizon dip.
   (Turnings   nil)    ;2D array of lists of Turning Points, indices:  X and Y.
   (Horizons   nil)    ;List of horizons computed by the Amos method.
   (Window     terminal-io)  ;Window in which maps of the horizons are displayed.
   (Time-Bins  nil)    ;List of numbers defining bins of Data times for maps.
   (Amplitude-Bins nil) ;List of numbers defining bins of Data amplitudes.
                       ;The bins are computed during display (Step 4).
```

```
  )
  ()
  :settable-instance-variables
  (:documentation
   "The Amos flavor coordinates the Amos method.  To use the method make
    an instance, providing the Data array as an Init Option, and send the
    instance the :COMPUTE-HORIZONS message.  N, D, and Window are optional
    Init Options."))

(defmethod (amos :COMPUTE-HORIZONS) ()
  "Constructs the Horizons representation using the Amos method and
   displays maps of the horizons."
  (send self :determine-turning-points)                           ;Step (1).
  (send self :determine-pairs-of-turnings-on-the-same-horizon)    ;Step (2).
  (send self :extract-horizons)                                   ;Step (2).
  (send self :display-horizons))                                  ;Step (4).

#|======================================================================
                     TURNING POINT REPRESENTATION
  ======================================================================|#

(defflavor TURNING
  (
    (X          0)      ;Integer, the X coordinate of the location in Dn-Data.
    (Y          0)      ;Integer, the Y coordinate.
    (Time       0.0)    ;Number, the interpolated time of the zero-crossing.
    (Amplitude  0.0)    ;Number, the interpolated amplitude.
    (Sign       0)      ;Number, the sign (+/-1) of the partial of Dn-Data at Time.
    (Nt+        nil)    ;Nearest neighboring turnings in the Time directions (+/-).
    (Nt-        nil)
    (Nx+        nil)    ;Nearest neighboring turnings of the same horizon in the
    (Nx-        nil)    ;X and Y directions (+/-).  Initially each is just the
    (Ny+        nil)    ;nearest neighboring turning on the adjacent trace; at the
    (Ny-        nil)    ;end of Step (2) they connect only paired turnings.
    (Horizon    nil)    ;Array representing the horizon, if any, of this turning.
  )
  ()
  :settable-instance-variables
  (:init-keywords (:specification))
  (:documentation
   "The Turning flavor represents a Turning Point in the Amos method.
    The Specification Init Option, (Time Data Dn-Data), specifies that
    a turning occurs on the trace between Time and Time+1.  Amplitudes
    interpolated for the turnings are used when displaying horizons."))

(defmethod (turning :AFTER :INIT) (init-options)
  "Initializes the Time, Amplitude, and Sign of the turning."
  (let* ((t1 (first (get init-options :specification)))
         (data (second (get init-options :specification)))
         (dn-data (third (get init-options :specification)))
         (t2 (+ t1 1))
         (v1 (aref dn-data X Y t1))    ;Nth partials at t1 and t2.
         (v2 (aref dn-data X Y t2))
         (a1 (aref data X Y t1))       ;Amplitudes at t1 and t2.
         (a2 (aref data X Y t2)))
    (setq Time (// (- (* (- v2 v1) t2) v2) (- v2 v1))
          Amplitude (let ((m (// (- a2 a1) (- t2 t1))))
                     (+ (* m Time) (- a2 (* m t2))))
          Sign (if (> v2 v1) 1 -1))))

#|======================================================================
                STEP 1:  DETERMINE TURNING POINTS
  ======================================================================|#

(defmethod (amos :DETERMINE-TURNING-POINTS) ()
  "Constructs the Turnings representation."
  (send self :compute-nth-partial-derivative-of-data)
  (send self :mark-zero-crossings-in-nth-derivative))

(defmethod (amos :COMPUTE-NTH-PARTIAL-DERIVATIVE-OF-DATA) ()
```

```
"Computes the nth partial derivative of Data with respect to Time, leaving
 the result in Dn-Data."
(setq Dn-Data (make-array (array-dimensions Data) :type :art-q))
(copy-array-contents Data Dn-Data)   ;Dn-Data is just Data in case N = 0.
(loop with data* = (make-array (array-dimensions Data) :type :art-q)
      repeat N do
      (copy-array-contents Dn-Data data*)
      (send self :compute-partial-derivative data* Dn-Data)))

(defmethod (amos :COMPUTE-PARTIAL-DERIVATIVE) (data* d1-data*)
  "Computes the partial derivative of DATA* with respect to Time, leaving
   the result in D1-DATA*."
  (loop with (xdim ydim tdim) = (array-dimensions data*)
        for x below xdim do
        (loop for y below ydim do
              ;Compute derivatives at times 1 through TDIM - 2:
              (loop for time from 1 to (- tdim 2) do
                    (aset (// (- (aref Data x y (+ time 1))
                                 (aref Data x y (- time 1)))
                              2.0)
                          d1-data* x y time))
              ;Compute derivatives at times 0 and TDIM - 1 (special cases):
              (aset (- (aref Data x y 1) (aref Data x y 0))
                    d1-data* x y 0)
              (aset (- (aref Data x y (- tdim 1)) (aref Data x y (- tdim 2)))
                    d1-data* x y (- tdim 1)))))

(defmethod (amos :MARK-ZERO-CROSSINGS-IN-NTH-DERIVATIVE) ()
  "Constructs the Turnings representation, creating one Turning for
   each zero-crossing in Dn-Data.  The original implementation of the
   Amos method also created Turnings for zero-touchings; the touchings
   are omitted here for simplicity."
  (loop with (xdim ydim tdim) = (array-dimensions Dn-Data)
        initially (setq Turnings (make-array (list xdim ydim) :type 'art-q))
        for x below xdim do
        (loop for y below ydim do
              (aset (loop ;Check for a turning in each interval, [time,time+1]:
                          for time from 0 to (- tdim 2)
                          for value-at-time = (aref Dn-Data x y time)
                          for value-at-time+1 = (aref Dn-Data x y (+ time 1))
                          if (or (and (plusp value-at-time)
                                      (minusp value-at-time+1))
                                 (and (minusp value-at-time)
                                      (plusp value-at-time+1)))
                          collect (make-instance 'turning :x x :y y
                                                 :specification `(,time ,Data ,Dn-Data)))
                    Turnings x y))))

#|========================================================================
      STEP 2:   DETERMINE PAIRS OF TURNINGS ON THE SAME HORIZON
  ========================================================================|#

(defmethod (amos :DETERMINE-PAIRS-OF-TURNINGS-ON-THE-SAME-HORIZON) ()
  "Scans the Turnings representation to set the Nx+/- and Ny+/- pointers
   to adjacent turnings of the same horizon."
  (send self :initialize-nearest-neighbors)
  (send self :apply-pairing-criteria))

(defmethod (amos :INITIALIZE-NEAREST-NEIGHBORS) ()
  "Sets the Nt+/-, Nx+/-, and Ny+/- pointers to the nearest neighboring
   turnings in the indicated directions."
  ;Initialize the Nt+/- pointers (these simplify operations later):
  (loop with (xdim ydim) = (array-dimensions Turnings)
        for x below xdim do
        (loop for y below ydim do
              (loop with previous-turning = (first (aref Turnings x y))
                    for current-turning in (cdr (aref Turnings x y)) do
                    (send previous-turning :set-nt+ current-turning)
                    (send current-turning :set-nt- previous-turning)
                    (setq previous-turning current-turning))))
```

```
;Initialize the Nx+/- pointers:
(loop with (xdim ydim) = (array-dimensions Turnings)
      for y below ydim do
      (loop for x from 1 below xdim
            for previous-turning-list = (aref Turnings (- x 1) y)
            for current-turning-list = (aref Turnings x y) do
            (send self :initialize-nearest-neighbors-between-two-traces
                  :set-nx+ previous-turning-list current-turning-list)
            (send self :initialize-nearest-neighbors-between-two-traces
                  :set-nx- current-turning-list previous-turning-list)))
;Initialize the Ny+/- pointers:
(loop with (xdim ydim) = (array-dimensions Turnings)
      for x below xdim do
      (loop for y from 1 below ydim
            for previous-turning-list = (aref Turnings x (- y 1))
            for current-turning-list = (aref Turnings x y) do
            (send self :initialize-nearest-neighbors-between-two-traces
                  :set-ny+ previous-turning-list current-turning-list)
            (send self :initialize-nearest-neighbors-between-two-traces
                  :set-ny- current-turning-list previous-turning-list))))

(defmethod (amos :INITIALIZE-NEAREST-NEIGHBORS-BETWEEN-TWO-TRACES)
           (set-n* turning-list-a turning-list-b)
  "Sets the Nx+/- or Ny+/- pointer, as indicated by SET-N* (e.g. :SET-NX+),
of each turning in the A list to the nearest B list turning."
  (loop for a-turning in turning-list-a
        if (not (null turning-list-b))
        do (loop with previous-b-turning = (first turning-list-b)
                 for current-b-turning in (cdr turning-list-b)
                 until (> (send current-b-turning :time)
                          (send a-turning :time))
                 do (setq previous-b-turning current-b-turning)
                 finally
                 (if (or (null current-b-turning)  ;In case just 1 b-turning.
                         (< (abs (- (send a-turning :time)
                                    (send previous-b-turning :time)))
                            (abs (- (send a-turning :time)
                                    (send current-b-turning :time)))))
                     (send a-turning set-n* previous-b-turning)
                     (send a-turning set-n* current-b-turning)))))

(defmethod (amos :APPLY-PAIRING-CRITERIA) ()
  "The four criteria in Step 2 of the Amos method are applied to prune
and adjust the pointers."
  (send self :apply-mutual-nearest-neighbor-and-homogeneous-signs-criteria)
  (send self :apply-low-curvature-criterion)
  (send self :apply-3d-continuity-criterion))

(defmethod (amos :APPLY-MUTUAL-NEAREST-NEIGHBOR-AND-HOMOGENEOUS-SIGNS-CRITERIA)
           ()
  "Scans all turnings, adjusting pointers according to the MNN and HS
criteria in all four directions."
  (send self :determine-nearest-neighboring-candidates-with-equal-signs)
  (send self :prune-according-to-mutual-nearest-neighbor-criterion))

(defmethod (amos :DETERMINE-NEAREST-NEIGHBORING-CANDIDATES-WITH-EQUAL-SIGNS) ()
  "Scans all turnings. Each turning votes for the most appropriate pairing,
according to the MNN and HS criteria, in each direction."
  (loop with (xdim ydim) = (array-dimensions Turnings)
        for x below xdim do
        (loop for y below ydim do
              (loop for turning in (aref Turnings x y) do
                    (send self :vote-for-nearest-equal-sign-candidate
                          turning :nx+ :set-nx+)
                    (send self :vote-for-nearest-equal-sign-candidate
                          turning :nx- :set-nx-)
                    (send self :vote-for-nearest-equal-sign-candidate
                          turning :ny+ :set-ny+)
                    (send self :vote-for-nearest-equal-sign-candidate
                          turning :ny- :set-ny-)))))
```

```
(defmethod (amos :VOTE-FOR-NEAREST-EQUAL-SIGN-CANDIDATE) (turning n* set-n*)
  "The N* pointer of TURNING is adjusted to the nearest neighboring turning
   in that direction that agrees in sign.  An additional criterion is applied
   to preserve the property of mutual nearest neighbor pairings that no
   pairings cross; pointers that may result in such a crossing are set to NIL."
  (let ((n*-turning (send turning n*)))
     (if (not (null n*-turning))
        ;If the turnings agree in sign then N* is already the right vote.
        (if (not (= (send turning :sign) (send n*-turning :sign)))
            ;Consider changing N* to the next nearest turning without crossing:
            (if (> (send turning :time) (send n*-turning :time))
                ;TURNING is below N*-TURNING so consider the next lowest one:
                (let ((n*t+ (send n*-turning :nt+)))
                  (if (and (not (null n*t+))
                           (= (send turning :sign) (send n*t+ :sign)))
                      (send turning set-n* n*t+)
                      (send turning set-n* nil)))
                ;TURNING is above N*-TURNING so consider the next highest one:
                (let ((n*t- (send n*-turning :nt-)))
                  (if (and (not (null n*t-))
                           (= (send turning :sign) (send n*t- :sign)))
                      (send turning set-n* n*t-)
                      (send turning set-n* nil)))
                ;N.B. The case of TURNING having the same time as N*-TURNING is
                ;treated as the "above" case.  It would be better to pick the
                ;nearest of N*T+ and N*T-, as in the original implementation.
                )))))

(defmethod (amos :PRUNE-ACCORDING-TO-MUTUAL-NEAREST-NEIGHBOR-CRITERION) ()
  "Sets NX/Y/+/- pointers to NIL if they are not in the mutual nearest
   neighbor relation."
  (loop with (xdim ydim) = (array-dimensions Turnings)
        for x from 0 below xdim do
        (loop for y from 0 below ydim do
              (loop for turning in (aref Turnings x y) do
                    (send self :prune-according-to-mnn-directionally
                          turning :nx+ :set-nx+ :nx-)
                    (send self :prune-according-to-mnn-directionally
                          turning :nx- :set-nx- :nx+)
                    (send self :prune-according-to-mnn-directionally
                          turning :ny+ :set-ny+ :ny-)
                    (send self :prune-according-to-mnn-directionally
                          turning :ny- :set-ny- :ny+)))))

(defmethod (amos :PRUNE-ACCORDING-TO-MNN-DIRECTIONALLY)
           (turning n*a set-n*a n*b)
  "Prunes the N*A pointer of TURNING if it does not point to a turning
   in the mutual nearest neighbor relation with TURNING."
  (if (and (not (null (send turning n*a)))
           (not (eq turning (send (send turning n*a) n*b))))
      (send turning set-n*a nil)))

(defmethod (amos :APPLY-LOW-CURVATURE-CRITERION) ()
  "Scans all pairings, removing those that violate the low curvature
   criterion."
  (loop with (xdim ydim) = (array-dimensions Turnings)
        for x from 0 below xdim do
        (loop for y from 0 below ydim do
              (loop for turning in (aref Turnings x y) do
                    (send self :prune-according-to-low-curvature-directionally
                          turning :nx- :set-nx- :nx+ :set-nx+)
                    (send self :prune-according-to-low-curvature-directionally
                          turning :ny- :set-ny- :ny+ :set-ny+)))))

(defmethod (amos :PRUNE-ACCORDING-TO-LOW-CURVATURE-DIRECTIONALLY)
           (turning n*- set-n*- n*+ set-n*+)
  "Prunes the incident pairings in the * direction if the change in dip
   between the two pairings is greater than D.  Dip is computed in the
   (X, Y, Time) space where traces are spaced at unit intervals in the X
   and Y directions and Time is measured in sample points.  It would be
   more appropriate to compute dip using the actual trace intervals (in
   meters) and the true times (in milliseconds)."
```

```
   (let ((turning-n*- (send turning n*-))
         (turning-n*+ (send turning n*+)))
     (cond
       ((and (not (null turning-n*-))
             (not (null turning-n*+))
             (> (abs (- (- (send turning :time) (send turning-n*- :time))
                        (- (send turning-n*+ :time) (send turning :time))))
                D))
        (send turning-n*-  set-n*+ nil)
        (send turning       set-n*- nil)
        (send turning       set-n*+ nil)
        (send turning-n*+  set-n*- nil))))))

(defmethod (amos :APPLY-3D-CONTINUITY-CRITERION) ()
  "Scans all pairings, removing those that violate the three-dimensional
   continuity criterion."
  (loop with (xdim ydim) = (array-dimensions Turnings)
        for x from 0 below xdim do
          (loop for y from 0 below ydim do
            (loop for turning in (aref Turnings x y) do
              (send self :prune-according-to-3d-continuity-directionally
                    turning :nx+ :set-nx+ :nx- :set-nx- :ny+ :ny-)
              (send self :prune-according-to-3d-continuity-directionally
                    turning :ny+ :set-ny+ :ny- :set-ny- :nx+ :nx-))
            )))

(defmethod (amos :PRUNE-ACCORDING-TO-3D-CONTINUITY-DIRECTIONALLY)
           (turning na+ set-na+ na- set-na- nb+ nb-)
  "Eliminates the NA+ pairing of TURNING if the pairing is not part of
   a local loop on either side (in the B+ or B- direction) of the pairing."
  (cond
    ((and (not (null (send turning na+)))
          (not (or (send self :local-loop-ties-p turning na+ nb+ na- nb-)
                   (send self :local-loop-ties-p turning na+ nb- na- nb+))))
     (send (send turning na+) set-na- nil)
     (send turning set-na+ nil))))

(defmethod (amos :LOCAL-LOOP-TIES-P) (turning &rest n*i)
  "Returns T iff TURNING is reached by following the four n*i pointers,
   starting from TURNING."
  (loop for n* in n*i
        for current-turning first (send turning n*)
                            then (send current-turning n*)
        until (null current-turning)
        finally (return (eq turning current-turning))))

#|========================================================================
                      STEP 3:   EXTRACT HORIZONS
========================================================================|#

(defmethod (amos :EXTRACT-HORIZONS) ()
  "Collects turnings connected by the pairings determined in Step 2 into
   horizons, constructing the Horizons representation."
  (loop with (xdim ydim) = (array-dimensions Turnings)
        for x from 0 below xdim do
          (loop for y from 0 below ydim do
            (loop for turning in (aref Turnings x y)
                  if (and (null (send turning :horizon))
                          (or (not (null (send turning :nx+)))
                              (not (null (send turning :nx-)))
                              (not (null (send turning :ny+)))
                              (not (null (send turning :ny-)))))
                    do (send self :extract-horizon turning)))))

(defmethod (amos :EXTRACT-HORIZON) (turning)
  "Collects turnings connected to TURNING by the pairings determined
   in Step 2 into a horizon array and adds it to Horizons."
  (let ((horizon (make-array (firstn 2 (array-dimensions Data)) :type 'art-q)))
    (send self :add-turning-to-horizon turning horizon)
    (push horizon Horizons)))
```

```
(defmethod (amos :ADD-TURNING-TO-HORIZON) (turning horizon)
  "If TURNING is not already part of a horizon and HORIZON does not already
   have a turning at the (X,Y) position of TURNING (enforcing the Vertical
   Uniqueness criterion), then TURNING is added to HORIZON and all turnings
   paired with TURNING are added to HORIZON (using the Transitivity of the
   Pair Relation criterion)."
  (cond
    ((and (not (null turning))
          (null (send turning :horizon))
          (null (aref horizon (send turning :x) (send turning :y))))
     (send turning :set-horizon horizon)
     (aset turning horizon (send turning :x) (send turning :y))
     (send self :add-turning-to-horizon (send turning :nx+) horizon)
     (send self :add-turning-to-horizon (send turning :nx-) horizon)
     (send self :add-turning-to-horizon (send turning :ny+) horizon)
     (send self :add-turning-to-horizon (send turning :ny-) horizon))))

#|================================================================
                  STEP 4:  DISPLAY HORIZONS
 ================================================================|#

(defmethod (amos :DISPLAY-HORIZONS) (&optional (attribute :time))
  "Displays color maps of the Horizons, one by one, in Window.  The
   ATTRIBUTE values, :TIME or :AMPLITUDE, are indicated by color.  After
   each display the program waits for any character to be typed before
   proceeding to map the next horizon."
  (if (null Amplitude-Bins)
      (send self :compute-amplitude-bins-for-data))
  (loop for horizon in Horizons do
        (send Window :clear-screen)
        (send self :display-horizon horizon attribute)
        (tyi)))

(defvar 4-BIT-COLORS) ;ART-Q-16 of ART-4B-8-1's; colors 0:15 respectively.
(defvar 1-BIT-COLORS) ;ART-Q-16 of ART-1B-32-4's; B&W patterns for colors 0:15.

(defmethod (amos :DISPLAY-HORIZON) (horizon attribute)
  "Displays a color map of the ATTRIBUTE of HORIZON in Window.  If ATTRIBUTE is
   :AMPLITUDE all amplitudes lying within the same Amplitude-Bin (defined by
   :COMPUTE-AMPLITUDE-BINS-FOR-DATA) are displayed in the same color.  If
   ATTRIBUTE is :TIME the time range of the horizon is divided into fourteen
   equal color bins.  The (X=0,Y=0) corner of the map appears in the lower-left
   corner of the window.  The X axis is horizontal and the Y axis is vertical."
  (if (eq attribute :time)
      (send self :compute-time-bins-for-horizon horizon))
  (multiple-value-bind (width height) (send window :inside-size)
    (tv:prepare-sheet (window)
      (loop with screen = (tv:sheet-screen-array window)
            and left = (tv:sheet-inside-left window)
            and top = (tv:sheet-inside-top window)
            and (hxdim hydim) = (array-dimensions horizon)
            with pixel-width = (max 1 (// width hxdim))
            and pixel-height = (max 1 (// height hydim))
            with wxmax = (+ left (* pixel-width (- (min hxdim width) 1)))
            and wymax = (+ top (* pixel-height (- (min hydim height) 1)))
            with colors = (if (eq 'art-1b (array-type screen))
                              1-bit-colors 4-bit-colors)
            with alu = tv:alu-ior
            for wy* from top to wymax by pixel-height
            for wy from wymax by (- pixel-height)
            for hy from 0 by 1 do
            (loop for wx from left to wxmax by pixel-width
                  for hx from 0 by 1
                  for turning = (aref horizon hx hy)
                  if (not (null turning))
                    do (bitblt alu pixel-width pixel-height
                               (aref colors (send self :color-for-turning
                                                  turning attribute))
                               0 0
                               screen wx wy))))))
```

```
(defmethod (amos :COMPUTE-AMPLITUDE-BINS-FOR-DATA) ()
  "Sets Amplitude-Bins to a list of numbers defining fourteen divisions of the
   amplitude range of Data. The first seven bins represent negative amplitudes
   and the other seven span the postive amplitudes."
  (loop with (xdim ydim tdim) = (array-dimensions Data)
        and  min-amplitude = 1e34
        and  max-amplitude = -1e34
        for x from 0 below xdim do
        (loop for y from 0 below ydim do
              (loop for time from 0 below tdim
                    for amplitude = (aref Data x y time) do
                    (if (< amplitude min-amplitude)
                        (setq min-amplitude amplitude))
                    (if (> amplitude max-amplitude)
                        (setq max-amplitude amplitude))))
        finally
        (setq Amplitude-Bins
             `(-1e34
               ,@(loop with bin-width = (// (- 0 min-amplitude) 6.0)
                       repeat 6
                       for bin from (+ min-amplitude bin-width) by bin-width
                       collect bin)
               0
               ,@(loop with bin-width = (// (- max-amplitude 0) 6.0)
                       repeat 6
                       for bin from (+ 0 bin-width) by bin-width
                       collect bin)
               1e34))))

(defmethod (amos :COMPUTE-TIME-BINS-FOR-HORIZON) (horizon)
  "Sets Time-Bins to a list of numbers defining fourteen equal divisions of
   the time range of HORIZON. Time values are negated so that time zero is
   assigned the largest color number. Thus the time color maps are analogous
   to elevation maps: structural highs of horizons are assigned larger color
   numbers than structural lows."
  (loop with (xdim ydim) = (array-dimensions horizon)
        and  min-time = 1e34
        and  max-time = -1e34
        for x from 0 below xdim do
        (loop for y from 0 below ydim
              for turning = (aref horizon x y)
              if (not (null turning))
                do (let ((time (- (send turning :time))))
                     (if (< time min-time) (setq min-time time))
                     (if (> time max-time) (setq max-time time))))
        finally
        (setq Time-Bins
             `(-1e34
               ,@(loop with bin-width = (// (- max-time min-time) 13.0)
                       repeat 13
                       for bin from (+ min-time bin-width) by bin-width
                       collect bin)
               1e34))))

(defmethod (amos :COLOR-FOR-TURNING) (turning attribute)
  "Returns a color (bin number) for the ATTRIBUTE of TURNING."
  (multiple-value-bind (t0 t1 t2 t3 t4 t5 t6 t7 t8 t9 t10 t11 t12 t13 t14)
      (values-list (selectq attribute
                     (:amplitude Amplitude-Bins)
                     (:time Time-Bins)))
    (let ((attribute-value (send turning attribute)))
      (if (eq attribute :time)
          ;Negate time so structural highs have largest color values:
          (setq attribute-value (- attribute-value)))
      ;Hard-coded binary search for the corresponding attribute-value bin:
      (if (>= attribute-value t7)
          (if (>= attribute-value t11)
              (if (>= attribute-value t13)
                  (if (>= attribute-value t14) 15 14)
                  (if (>= attribute-value t12) 13 12))
              (if (>= attribute-value t9)
```

```
                        (if (>= attribute-value t10)  11  10)
                        (if (>= attribute-value t8)    9   8)))
              (if (>= attribute-value t3)
                  (if (>= attribute-value t5)
                      (if (>= attribute-value t6)   7  6)
                      (if (>= attribute-value t4)   5  4))
                  (if (>= attribute-value t1)
                      (if (>= attribute-value t2)   3  2)
                      (if (>= attribute-value t0)   1  0)))))))))

;The remaining variables and functions support the :DISPLAY-HORIZONS method.

(defvar 1-BIT-COLORS-SPECIFICATION
   '((#o0000 #o0000 #o0000 #o0000)      ;0  1-bits (all white); background color.
     (#o1111 #o1110 #o1111 #o1111)      ;15 1-bits (nearly all black).
     (#o1011 #o1110 #o1111 #o1111)      ;14
     (#o1011 #o1110 #o0111 #o1111)      ;13
    ;(#o1011 #o1110 #o0111 #o1101)      ;12 (Chosen to be left out.)
     (#o1010 #o1110 #o0111 #o1101)      ;11
     (#o0010 #o1110 #o0111 #o1101)      ;10
     (#o0010 #o1110 #o0111 #o0101)      ;9
     (#o0010 #o1110 #o0111 #o0100)      ;8
     (#o0000 #o1110 #o0111 #o0100)      ;7
     (#o0000 #o0110 #o0111 #o0100)      ;6
     (#o0000 #o0110 #o0111 #o0000)      ;5
     (#o0000 #o0110 #o0110 #o0000)      ;4
     (#o0000 #o0010 #o0110 #o0000)      ;3
     (#o0000 #o0000 #o0110 #o0000)      ;2
     (#o0000 #o0000 #o0010 #o0000)      ;1  1-bit (nearly all white).
     (#o1111 #o1111 #o1111 #o1111)))    ;16 1-bits (all black); outlining color.

(defun CREATE-4-BIT-COLORS ()
   (setq 4-bit-colors (make-array '(16) :type 'art-q))
   (loop for color from 0 to 15
         for array = (make-array '(8 1) :type 'art-4b) do
         (loop for i from 0 to 7 do (aset color array i 0))
         (aset array 4-bit-colors color)))

(defun CREATE-1-BIT-COLORS ()
   (setq 1-bit-colors (make-array '(16) :type 'art-q))
   (loop for color from 0 to 15
         for 1-bit-color in 1-bit-colors-specification
         for array = (call #'tv:make-gray () 4 () 4 :spread 1-bit-color) do
         (aset array 1-bit-colors color)))

(eval-when (load eval)
   (create-4-bit-colors)
   (create-1-bit-colors))

#|==========================================================================
                    Convenience Functions for System Use
==========================================================================|#

(defvar *AMOS-INSTANCES* nil)   ;List of all instances of AMOS during a session.

(defun APPLY-AMOS-METHOD
       (&optional (data nil) (window terminal-io) (n 1) (d 0.5))
   "Applies the Amos method to DATA, displaying the resulting time structure
    maps in WINDOW.  If DATA is NIL, a 3D array of hypothetical data is used
    (obtained via CREATE-SEISMIC-DATA-ARRAY)."
   (let ((amos (make-instance 'amos
                  :data (if (null data) (create-seismic-data-array) data)
                  :window window
                  :n n
                  :d d)))
      (push amos *amos-instances*)
      (send amos :compute-horizons)))

(defun CREATE-SEISMIC-DATA-ARRAY
       (&optional (x-dim 10) (y-dim 10) (time-dim 20)
        (trace-generation-function #'sin)
        (dip-generation-function #'dome-generation-function))
```

```
"Returns an array of hypothetical seismic data suitable for Data in the AMOS
flavor. This function is not part of the Amos method.  TRACE-GENERATION-
FUNCTION is a function of Time that defines the form of every trace.
DIP-GENERATION-FUNCTION is a function of X and Y that defines the offset of
the starting point of each trace from zero."
(loop with array = (make-array (list x-dim y-dim time-dim) :type 'art-q)
      for x below x-dim do
         (loop for y below y-dim do
               (loop for time below time-dim do
                     (aset (funcall trace-generation-function
                                    (+ time
                                       (funcall dip-generation-function x y)))
                           array x y time)))
         finally (return array)))

(defun DOME-GENERATION-FUNCTION (x y)
  "Defines a dome-like structure that peaks at (X=4,Y=6), suitable for use with
  CREATE-SEISMIC-DATA-ARRAY."
  (* -0.1 (sqrt (+ (* (- x 4) (- x 4))
                   (* (- y 6) (- y 6))))))
```

I claim:

1. A system for automatically producing representations of three-dimensional surfaces from processed data in the form of digital traces, comprising:
   (a) means connected to receive the digital traces for identifying events in the digital traces;
   (b) means connected to receive the identified events for determining pairs of events that tentatively lie in the same three-dimensional surface represented in a first format;
   (c) means responsive to the determined pairs of events for reformatting at least one three-dimensional surface in a second format; and
   (d) storage means connected to receive the second format for storing a representation of the three-dimensional surface.

2. The system of claim 1 wherein the processed data comprises seismic data and the three-dimensional surface comprises a recommended horizon.

3. The system of claim 2 further comprising indicia means, connected to receive the horizon and to manifest a representation of the horizon.

4. The system of claim 3 wherein the means for identifying events in the digital traces comprises means for identifying turnings in the digital traces.

5. The system of claim 4 wherein the means for determining pairs of events comprises means for determining pairs of turnings in the same horizon.

6. The system of claim 5 wherein the means for determining pairs of events further comprises means for detecting like signs in a pair of turnings.

7. The system of claim 6 wherein the means for determining pairs of events further comprises means for measuring the curvature of the path formed by the paired turnings in successive digital traces and for terminating the path at any point when the curvature exceeds a predetermined limit.

8. The system of claim 7 wherein the means for determining pairs of events further comprises means for determining that at least four turnings forming four pairs of turnings lie in the same horizon, to provide the first format.

9. The system of claim 8 wherein the means for reformatting comprises means for extracting the recommended horizon by separately designating all turnings in the recommended horizon in a second format.

10. The system of claim 9 wherein the means for reformatting further comprises means for examining each turning in the first format, for its vertical uniqueness on the corresponding digital trace while separately designating all turnings in the recommended horizon, and for excluding any subsequent turning in the first format that is on the same digital trace as a prior turning.

11. The system of claim 10 wherein the indicia means comprises a visual display means.

12. The system of claim 11 wherein the visual display means comprises a cathode ray tube.

13. The system of claim 11 wherein the visual display means comprises a printer.

14. The system of claim 6 wherein the means for determining pairs of events further comprises means for determining that at least four turnings forming four pairs of turnings lie in the same horizon.

15. A method of automatically producing representations of three-dimensional recommended horizons from processed seismic data in the form of digital traces, comprising the steps of:
   (a) identifying events in the digital traces;
   (b) determining pairs of identified events that tentatively lie in the same horizon represented in a first format;
   (c) reformatting at least one horizon, represented in a second format; and
   (d) storing the second format as a representation of the recommended horizon.

16. The method of claim 15 further comprising the step of:
   (e) displaying a representation of the horizon.

17. The method of claim 15 wherein the step of identifying events comprises identifying turnings in the digital traces.

18. The method of claim 17 wherein the step of determining pairs of identified events comprises determining pairs of turnings.

19. The method of claim 18 wherein the step of determining pairs of identified events further comprises the step of detecting like signs in a pair of turnings.

20. The method of claim 19 wherein the step of determining pairs of identified events further comprises the steps of:
   (b) (i) measuring the curvature of the path formed by the paired turnings in successive digital traces; and
   (ii) terminating the path at any point when the curvature exceeds a predetermined limit.

21. The method of claim 20 wherein the step of determining pairs of identified events further comprises the step of determining that at least four turnings forming four pairs of turnings lie in the same horizon to provide the first format.

22. The method of claim 21 wherein the step of reformatting at least one horizon comprises the step of extracting the recommended horizon by separately designating all turnings in the recommended horizon in a second format.

23. The method of claim 22 wherein the step of reformatting at least one horizon further comprises the steps of:
- (c) (i) examining each turning in the first format for its vertical uniqueness on the corresponding digital trace while separately designating all turnings in the recommended horizon; and
- (ii) excluding any subsequent turning that is on the same digital trace as a turning detected in the step of examining.

* * * * *